(12) United States Patent
Lin et al.

(10) Patent No.: US 9,243,938 B2
(45) Date of Patent: Jan. 26, 2016

(54) SINGLE TEDS ELECTRONIC DATA SHEET FOR MULTIPLE ACCELEROMETERS

(75) Inventors: Sidney Lin, Bothell, WA (US); Rand Peterson, Mukilteo, WA (US)

(73) Assignee: Fluke Corporation, Everett, WA (US)

( * ) Notice: Subject to any disclaimer, the term of this patent is extended or adjusted under 35 U.S.C. 154(b) by 112 days.

(21) Appl. No.: 12/850,501

(22) Filed: Aug. 4, 2010

(65) Prior Publication Data

US 2012/0035869 A1   Feb. 9, 2012

(51) Int. Cl.
*G01D 18/00* (2006.01)
*G01D 21/00* (2006.01)

(52) U.S. Cl.
CPC .............. *G01D 18/008* (2013.01); *G01D 21/00* (2013.01)

(58) Field of Classification Search
CPC ..... G01P 15/00; G01P 1/127; A63B 2220/40; G01D 18/0008; G01D 21/00
USPC .............................. 702/85, 57, 104
See application file for complete search history.

(56) References Cited

U.S. PATENT DOCUMENTS

| | | | |
|---|---|---|---|
| 2006/0187017 A1* | 8/2006 | Kulesz et al. | 340/506 |
| 2009/0217755 A1* | 9/2009 | Hollander et al. | 73/432.1 |
| 2010/0161639 A1* | 6/2010 | Bobrow et al. | 707/759 |

FOREIGN PATENT DOCUMENTS

| | | | |
|---|---|---|---|
| CN | 1624428 A | 6/2005 |
| CN | 1804648 A | 7/2006 |
| CN | 101738242 A | 6/2010 |
| JP | 2002008081 A | 1/2002 |

OTHER PUBLICATIONS

Bosch, SMB365 Preliminary Datasheet, Rev. 1.2, May 30, 2006.*
Bosch, SMB380 Preliminary Data Sheet, Rev. 1.3, Sep. 18, 2007.*
IEEE Standard 1451.4, 2004, pp. 7-12.*
First Office Action dated Dec. 3, 2014, issued in corresponding Chinese Application No. 201110020438.2, filed Jan. 18, 2011, 20 pages.
Song, E.Y., and K. Lee, "Understanding IEEE 1451—Networked Smart Transducer Interface Standard," IEEE Instrumentation & Measurement Magazine, pp. 11-17, Apr. 2008.

* cited by examiner

*Primary Examiner* — Alexander Satanovsky
*Assistant Examiner* — Ivan Rabovianski
(74) *Attorney, Agent, or Firm* — Seed IP Law Group PLLC

(57) ABSTRACT

An accelerometer system has a node with a first single-axis accelerometer coupled to a single associated TEDS Transducer Electronic Data Sheet memory component in accordance with IEEE 1451 Standards. Information about second and third single-axis accelerometers external to the mode resides in the single TEDS memory component. The first, second, and third accelerometers are of the same type and manufacturer, and the single TEDS memory component is configured with a memory table having listings of identifying data common to all of the first, second, and third accelerometers and first, second, and third calibration data unique to the first, second, and third accelerometers, respectively.

2 Claims, 4 Drawing Sheets

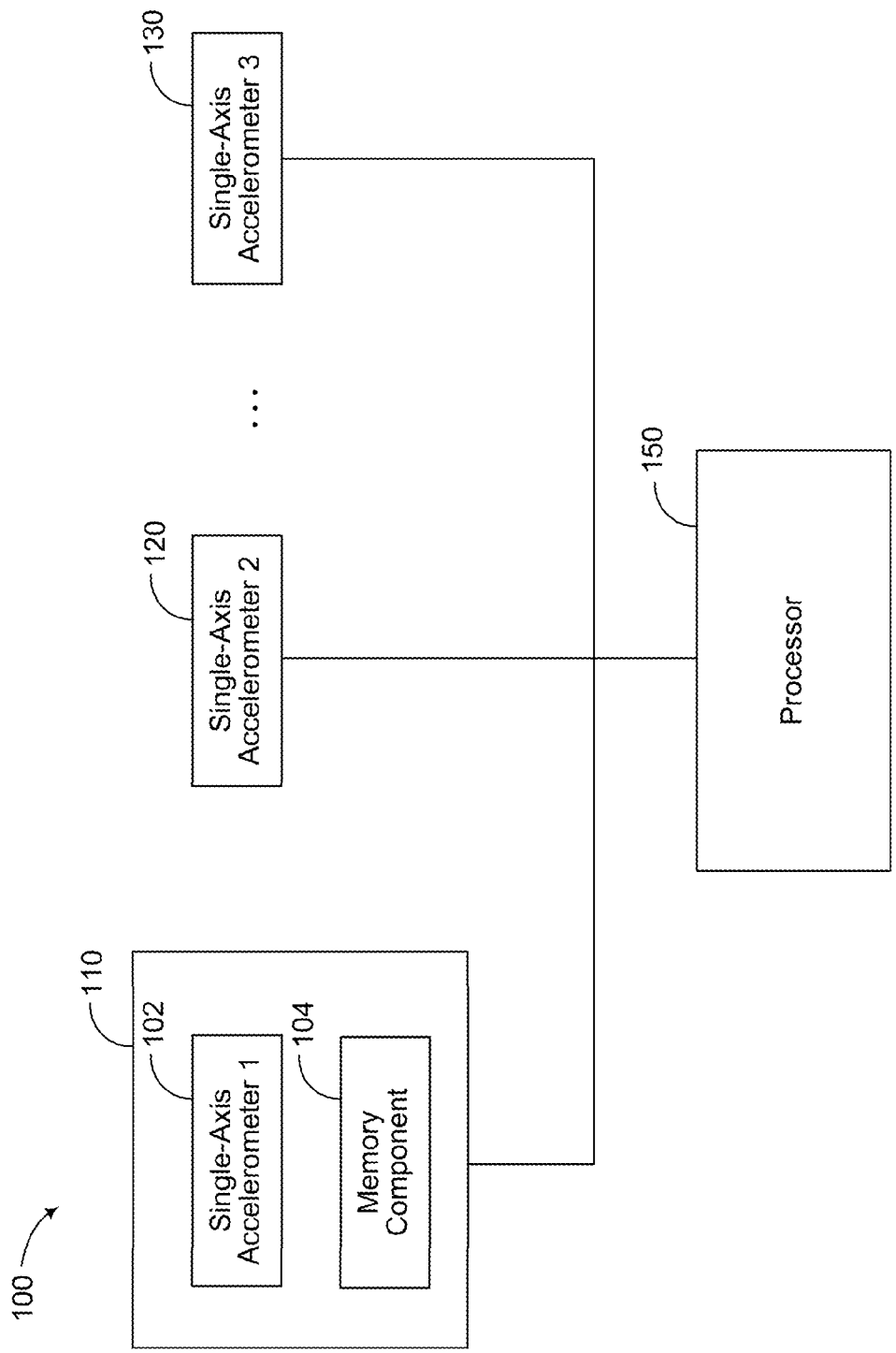

| Description | Units | Bit Size | Memory Location | Data Type (and Range) |
|---|---|---|---|---|
| CRC8*** | | 8 | R/W | UNINT (0 – 254) (00 – FE) |
| Manufacturing ID | | 14 | R/W | UNINT (17 – 16381) |
| Model # | | 15 | R/W | UNINT (0 – 32767) |
| Version Letter | | 5 | R/W | CHR5 (A-Z) |
| Version # | | 6 | R/W | UNINT (0 – 63) |
| Serial # | | 24 | R/W | UNINT (0 – 16777215) |
| RESERVED**** | | 8 | R/W | RESERVED HIGH |
| TEDS Template ID | | 8 | R/W | UNINT (0 – 254) |
| SensitivityX @ Reference Condition | mV/g | 16 | R/W | CONRELRES* (5E-7 to 172) |
| SensitivityY @ Reference Condition | mV/g | 16 | R/W | CONRELRES* (5E-7 to 172) |
| SensitivityZ @ Reference Condition | mV/g | 16 | R/W | CONRELRES* (5E-7 to 172) |
| Reference Frequency | Hz | 8 | R/W | CONRELRES* (0.35 to 2182) |
| Reference Temperature | °C | 8 | R/W | CONRES** (15 to 30) |
| High Pass Cutoff Frequency | Hz | 8 | R/W | CONRELRES* (0.005 to 13386) |
| Low Pass Cutoff Frequency | Hz | 8 | R/W | CONRELRES* (0.005 to 13386) |
| Transducer Stiffness | N/m | 6 | R/W | CONRELRES* (1E+6 to 8.114E+10) |
| Transducer Mass Below Gage | g | 6 | R/W | CONRELRES* (0.1 to 8114) |
| Transducer Weight | gram | 6 | R/W | CONRELRES* (0.1 to 8114) |
| Calibration Date | | 15 | R/W | DATE (Start date 01-JAN-1998) |
| Calibration Initials | | 15 | R/W | CHR5 (A-Z A-Z A-Z) |
| Calibration Period | days | 12 | R/W | UNINT (0 to 4094) |
| Measurement Location ID | | 11 | R/W | UNINT (0 to 2046) |
| Stiffness (TBD) | | 0 | R/W | TBD |
| Mass Below | | 0 | R/W | TBD |

FIG. 2

SINGLE TEDS ELECTRONIC DATA SHEET FOR MULTIPLE ACCELEROMETERS

TECHNICAL FIELD

The present disclosure relates to an electronic data sheet that stores information about multiple transducers or multiple channels in a single memory.

BACKGROUND

A transducer electronic data sheet (TEDS) stores transducer information, such as calibration data, identification information, and manufacturer information. TEDS formats are standardized and defined in the IEEE 1451 set of smart transducer interface standards. The TEDS is stored in a memory device attached to a transducer and contains the information needed by a measurement instrument or control system to interface with the transducer. As defined in the IEEE standard, each transducer has its own memory device, and that particular memory device only stores information pertaining to that transducer.

SUMMARY

In one aspect of the present invention, an accelerometer system comprises:

a node having a first single-axis accelerometer coupled to a single associated TEDS Transducer Electronic Data Sheet memory component in accordance with IEEE 1451 Standards, wherein information about the first accelerometer resides in the single TEDS memory component, such information including identifying data and first calibration data applicable to the first accelerometer;

a second single-axis accelerometer external to the node, wherein information about the second single-axis accelerometer resides in the single TEDS memory component, such information including identifying data and second calibration data applicable to the second single-axis accelerometer;

a third single-axis accelerometer external to the node, wherein information about the third single-axis accelerometer resides in the single TEDS memory component, such information including identifying data and third calibration data applicable to the third single-axis accelerometer;

a processor coupled, respectively, to: the node having the first single-axis accelerometer and the single TEDS memory component; the second single-axis accelerometer; and the third single-axis accelerometer; wherein the processor is configured to:

download the stored information from the single TEDS memory component, including the first, second, and third calibration data;

receive acceleration measurement data from the first, second, and third single-axis accelerometers;

apply the first, second, and third calibration data, respectively, to the acceleration measurement data from the first, second, and third single-axis accelerometers and calculate calibrated acceleration data for output to a user; and wherein the first, second and third accelerometers are of the same type and manufacturer, and the single TEDS memory component is configured with a memory table having listings of identifying data common to all of the first, second, and third accelerometers and the first, second, and third calibration data unique to the first, second, and third accelerometers, respectively.

In another aspect of the present invention an accelerometer sensor comprises:

a node having a first single-axis accelerometer coupled to a single associated TEDS Transducer Electronic Data Sheet memory component in accordance with IEEE 1451 Standards, wherein information about the first accelerometer resides in the single TEDS memory component, such information including identifying data and first calibration data applicable to the first accelerometer;

a second single-axis accelerometer external to the node, wherein information about the second single-axis accelerometer resides in the single TEDS memory component, such information including identifying data and second calibration data applicable to the second single-axis accelerometer;

a third single-axis accelerometer external to the node, wherein information about the third single-axis accelerometer resides in the single TEDS memory component, such information including identifying data and third calibration data applicable to the third single-axis accelerometer transducer, the node and the second and third accelerometer being adapted for coupling to a processor for receiving acceleration data from the first, second and third accelerometer transducers and for using the calibration data to calculate calibrated acceleration data; and wherein the first, second and third accelerometers are of the same type and manufacturer, and the single TEDS memory component is configured with a memory table having listings of identifying data common to all of the first, second, and third accelerometers and the first, second, and third calibration data unique to the first, second, and third accelerometers, respectively.

BRIEF DESCRIPTION OF THE DRAWINGS

Examples of a single electronic data sheet used for storing information about multiple transducers are illustrated in the figures. The examples and figures are illustrative rather than limiting.

FIG. 1 shows a block diagram illustrating multiple transducers accessible by a processor, where only one of the transducers is coupled directly to a memory component that stores information about all of the transducers.

FIG. 2 shows an example memory map containing information about three different transducers stored in a single memory component.

DETAILED DESCRIPTION

Figure 3:
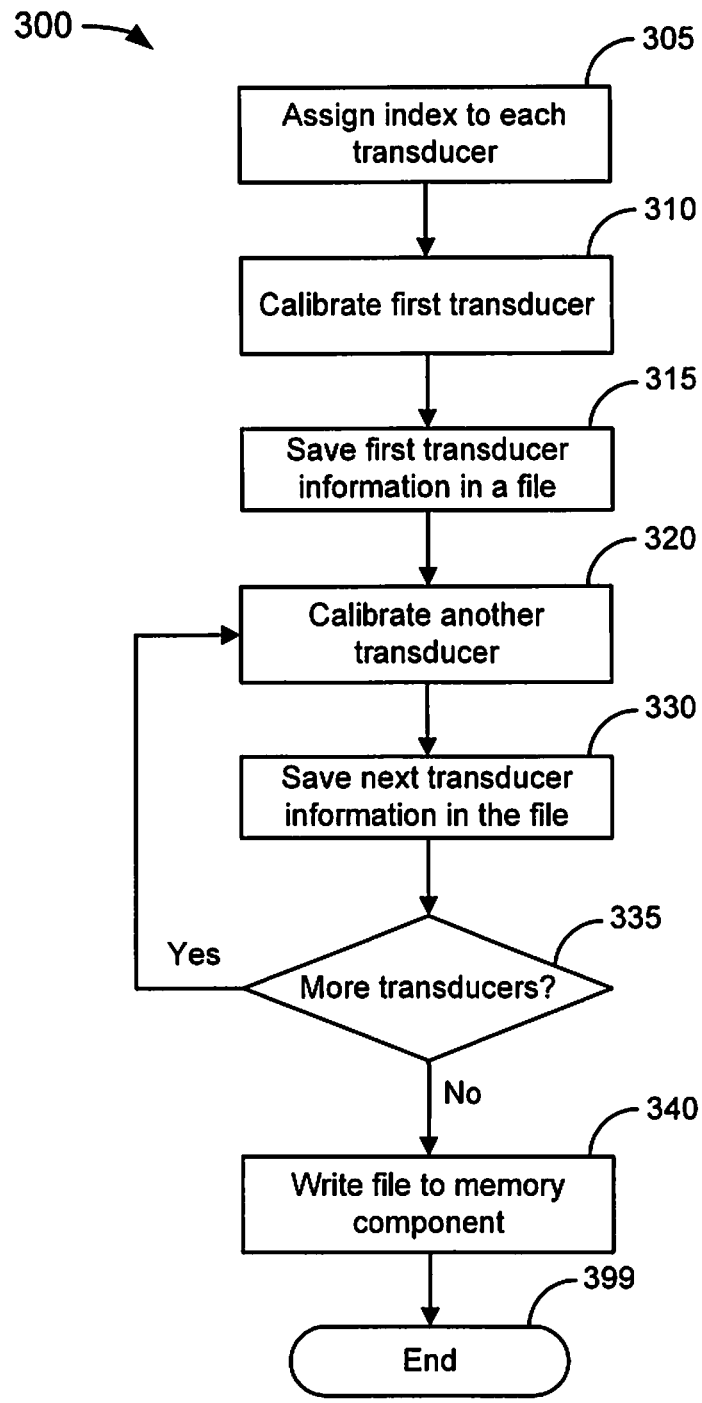
FIG. 3 depicts a flow diagram illustrating an example calibration process for multiple transducers and storage of the calibration data to a single memory component.

Various aspects and examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

In accordance with an exemplary embodiment to be described below, a memory component directly coupled to a transducer includes data sheet information for that transducer as well as for one or more other transducers in the system. The transducers are assigned unique identifying indices or names and information corresponding to a particular transducer is identified by that index or name to prevent confusion as to which piece of information stored in the memory applies to which transducer. Data in the memory is downloaded by the system processor and applied appropriately to any measured data acquired by the transducers and sent to the processor.

FIG. 1 depicts a block diagram 100 of a processor 150 able to communicate and receive data from multiple transducers 102, 120, 130 where data about the multiple transducers is stored in a single memory component 104 directly coupled to one of the transducers 102. The transducers 102, 120, 130 can be any type of sensor or actuator including, but not limited to, accelerometers, microphones, voltage sensors, thermocouples, and resistance temperature detectors. For clarity, only three transducers are shown in FIG. 1. However, more than three transducers can be used a system. The transducers can all be of the same type. Alternatively, one or more of the transducers can be different types. The processor 150 can be used to run applications that use data acquired by and received from the transducers 102, 120, 130 and access the memory component 104. In one embodiment, multiple processors (not shown) can access the memory component 104 as well as receive data acquired by the transducers 102, 120, 130.

The node 110 includes the transducer 102 and the memory component 104. Node 110 is similar to a TEDS node, as described in the IEEE 1451.4 standard for smart transducers. The memory component 104 is used to stored data about all of the transducers 102, 120, 130 including, but not limited to, basic TEDS information, such as transducer type and manufacturer identification, and standard TEDS information that can be found in a typical data sheet for a transducer, such as measurement range and calibration data for adjusting for variations in transducer sensitivity. The memory component 104 can be any type of RAM, ROM, or any combination of volatile and non-volatile memory. While the memory in an IEEE TEDS node only stores information about the transducer in that particular node, here the memory component 104 residing in node 110 with transducer 102 includes information for both the transducer 102 in the node 110 and other transducers 120, 130 that reside outside the node 110. The node 110 can also include other elements with additional functionality (not shown), for example, switches and counters.

In one embodiment, the interface between the TEDS node 110 and the processor 150 uses a 1-Wire® communications protocol where a serial signaling protocol combines a single signal and ground return. Bi-directional communications with the TEDS node 110 is initiated by the processor 150.

The IEEE 1451 standard defines different TEDS template formats for different types of transducers. In accordance with the present invention, the IEEE templates can be used for storing information about multiple transducers in a single memory component. However, distinguishing indices are used to label data corresponding to particular transducers.

FIG. 2 shows an example memory map 200 stored in a single memory component that contains information for two transducers 120, 130 outside the node 110 as well as the node transducer 102. The first column of the map provides a description of the elements in the memory map; the second column specifies the units, if any, of the corresponding memory map element; the third column states the number of bits that is assigned to the corresponding memory map element; the fourth column states whether the memory location is read (R) and/or write (W); and the fifth column provides the data type of the element and the range of values over which the element can run. The memory map 200 can be used for a particular application where the information for three accelerometers corresponding to the X, Y, and Z axes of a tri-axial accelerometer are stored.

The first eight elements in the memory map 200: CRC (cyclic redundancy check), manufacturer identification, model number of the accelerometer, version letter of the accelerometer, version number of the accelerometer, serial number of the accelerometer, bits reserved high for validation checks, and TEDS template identification used to map the TEDS information, apply to all of the accelerometers because all three accelerometers are the same type of transducer and are part of a single device made by one manufacturer. Similarly, the last 13 elements in the memory map 200: reference frequency at which the transducers were calibrated, reference temperature at which the transducers were calibrated, high pass cutoff frequency of the accelerometer, low pass cutoff frequency of the accelerometer, transducer stiffness, transducer mass below gage, transducer weight, calibration date, calibration initials of person who calibrated the accelerometer, calibration period for which the calibration is valid starting from the calibration date, measurement location identification of the facility that calibrated the accelerometer, stiffness of the accelerometer, and mass gage, are also the same for each of the three single-axis accelerometers. In one embodiment, when the memory map is used for accelerometers, the mass gage element is not of interest. Consequently, none of the names for these elements require the use of identifying indices to distinguish to which accelerometer the information is applicable.

However, in accordance with the present invention, the ninth, tenth, and eleventh elements in the memory map 200, sensitivityX @ reference condition, sensitivityY @ reference condition, and sensitivityZ @ reference condition apply specifically to the particular accelerometer 102, 120, 130 that measures acceleration along the x-axis, the y-axis, and the z-axis, respectively. Note that the name of the element is indexed with the axis of the accelerometer to which the information applies. Thus, sensitivityX applies to the transducer that measures acceleration in the x-axis direction, sensitivityY applies to the transducer that measures acceleration in the y-axis direction, and sensitivityZ applies to the transducer that measures acceleration in the z-axis direction. Because the sensitivity for the accelerometer measuring each of the three axes can be different, it is necessary to provide individualized information for each of the three accelerometers. In one embodiment, different calibration conditions can be measured for each transducer. The sensitivity values are ratio multipliers used to determine the actual measurement that is output from an accelerometer. For example, if one of the 100 mV/g accelerometer's axis measures 99 mV/g on a known vibration that is set to 100 mV/g, the recorded sensitivity value would be 99 mV/g. Thus, when the processor reads the sensor's sensitivity, it would offset all measured data by 1 mV/g, such that a reading of 99 mV/g is actually 100 mV/g.

In one embodiment, calibration constants stored in the memory map can be used to provide a very accurate sensor. For example, an acceleration sensor that is accurate to ±20% can be calibrated to perform to ±5% accuracy at a substantially reduced cost. Traditionally, components are tested and sorted to find units that are within a specified accuracy. Alternatively, component values may be dialed in using hardware, such as resistors and capacitors. However, by measuring and storing sensitivity and offset data for a transducer in a memory map, an appropriate adjustment can be made through a mathematical calculation to the data measured by that particular transducer. Consequently, a highly accurate transducer can be obtained at a relatively low cost as compared to transducers that are pre-sorted for accuracy or transducers that have attached hardware for bringing the transducer to within a required accuracy level.

Furthermore, for the case where a large number of transducers have their data sheets stored in a single memory component, the time required to read all of the information and separate out the data for each transducer is much less than the time it would take to read individual memory components attached to each transducer. Thus, processing time is significantly reduced with the use of a single memory component that stores information for many transducers.

FIG. 3 depicts a flow diagram illustrating an example calibration process 300 for multiple transducers and storage of the calibration data to a single memory component.

At block 305, the system assigns an index to each of the multiple transducers that are to be calibrated. The index can be any unique labeling of the transducers, for example, numeric labels, alphabetic labels, alphanumeric labels, or any other convenient label, such as the x, y, and z-axes of a tri-axial accelerometer.

At block 310, the system calibrates the first transducer, and at block 315, the system saves the information for the first transducer in a file in a suitable format, such as a TEDS template. Information stored in the file can include, but is not limited to, the data shown in memory map 200 in FIG. 2 above. At block 320, the system calibrates another transducer, and at block 330 the system saves the information for this transducer in the same file as used at block 315 or in another file.

At decision block 335, the system determines if there are any more transducers to calibrate. If there are more transducers to be calibrated (block 335—Yes), the process returns to block 320 to calibrate the next transducer. If there are no more transducers to be calibrated (block 335—No), the process continues to block 340 where the system writes the information from the one or more files describing the multiple transducers to the memory component that is directly coupled to one of the transducers that was calibrated during the process 300. The data transfer process to the memory component can be the same as described in the IEEE 1451 standard. The process ends at block 399.

The calibration process 300 can also be used for recalibrating the transducers. The transducers may need to be recalibrated upon expiration of a previous calibration or if the transducers are to be used under conditions that are different from a previous calibration.

Figure 4:
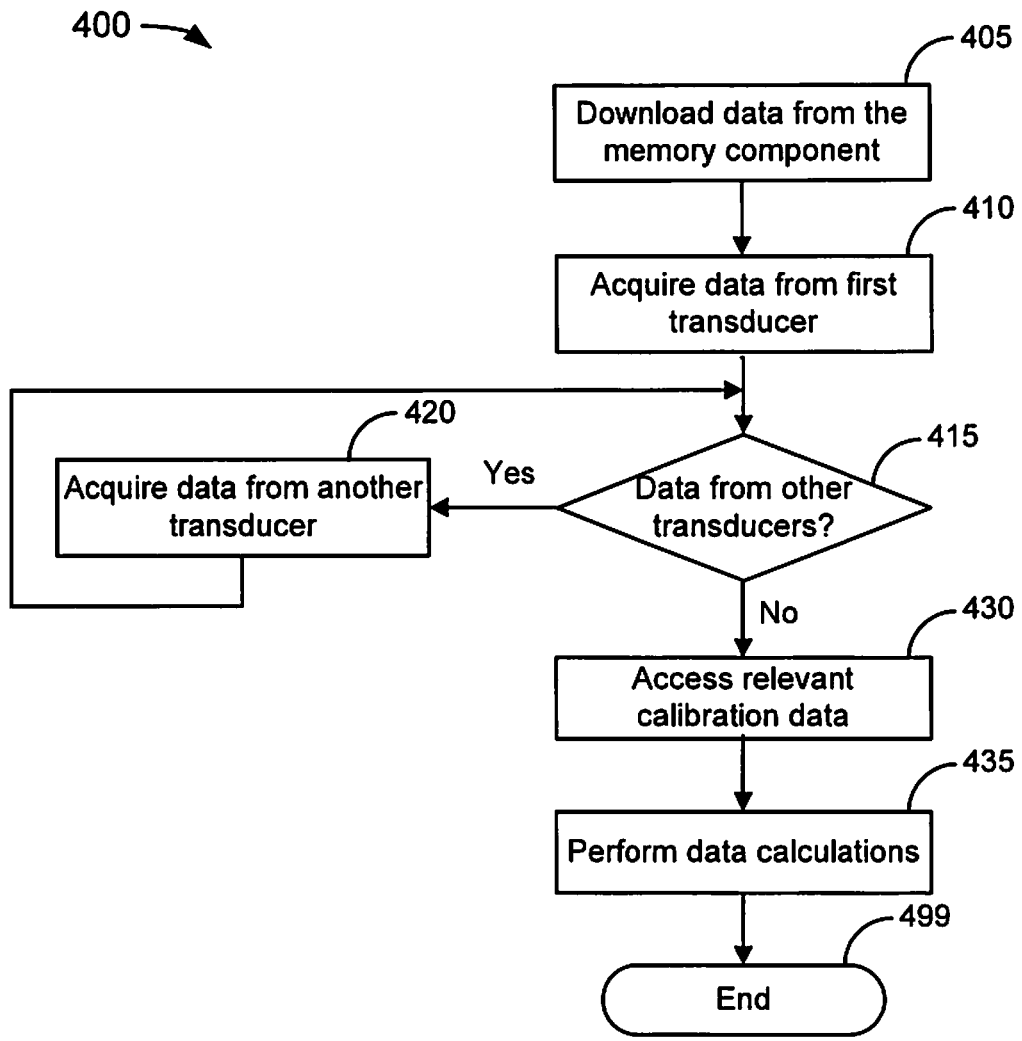
FIG. 4 depicts a flow diagram illustrating an example process of retrieving and using stored data for multiple transducers from a single memory component.

FIG. 4 depicts a flow diagram illustrating an example process 400 of retrieving and using stored data for multiple transducers from a single memory component.

At block 405, the system downloads the data from the memory component directly coupled to one of the transducers. Then at block 410 the system acquires data from a first transducer.

At decision block 415, the system determines whether data from another transducer needs to be acquired. If data from another transducer is needed (block 415—Yes), the process continues to block 420 to acquire data from the additional transducer. The process then returns to decision block 415. If data is not needed from any other transducer (block 415—No), the process continues to block 430 where the system accesses the relevant calibration data from the downloaded data.

In one embodiment, the data from all of the transducers in the system can automatically be acquired sequentially, rather than from each transducer independently, depending upon if the data from a particular transducer is needed, as described in blocks 410, 415, 420 above. However, once the measurement data from all of the transducers has been acquired, the processor can determine the relevant data and at block 430, the system can access the relevant calibration data.

At block 435, the system performs calculations on the measured data using the calibration data, such as adjusting the offset of the measurement data and applying the sensitivity data. The process ends at block 499.

CONCLUSION

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. Accordingly, the applicant reserves the right to add additional claims after filing the application to pursue such additional claim forms for other aspects of the invention.

What is claimed is:

1. An accelerometer system, comprising:
  a node that includes, internal to the node:
    a first single-axis accelerometer; and
    a single associated Transducer Electronic Data Sheet (TEDS) memory component, wherein information about the first single-axis accelerometer resides in the single TEDS memory component, such information including identifying data and first calibration data applicable to the first single-axis accelerometer;
  a second single-axis accelerometer external to the node, wherein information about the second single-axis accelerometer resides in the single TEDS memory component that is internal to the node, such information including identifying data and second calibration data applicable to the second single-axis accelerometer;
  a third single-axis accelerometer external to the node, wherein information about the third single-axis accelerometer resides in the single TEDS memory component internal to the node, such information including identifying data and third calibration data applicable to the third single-axis accelerometer; and
  a processor coupled, respectively, to:
    the node that includes the first single-axis accelerometer and the single TEDS memory component;
    the second single-axis accelerometer; and
    the third single-axis accelerometer;
  wherein the processor is configured to:
    download, from the single TEDS memory component, information about the first, second, and third single-axis accelerometers, including the first, second, and third calibration data;
    receive acceleration measurement data from the first, second, and third single-axis accelerometers; and
    apply the first, second, and third calibration data, respectively, to the acceleration measurement data from the first, second, and third single-axis accelerometers and calculate calibrated acceleration data for output to a user;
  wherein the first, second and third single-axis accelerometers are of the same type, and the single TEDS memory component is configured with a memory map containing (1) identifying data common to all of the first, second, and third single-axis accelerometers and (2) the first, second, and third calibration data unique to the first, second, and third single-axis accelerometers, respectively.

2. An accelerometer sensor, comprising:
  a node that includes, internal to the node:
    a first single-axis accelerometer; and
    a single associated Transducer Electronic Data Sheet (TEDS) memory component, wherein information about the first single-axis accelerometer resides in the single TEDS memory component, such information including identifying data and first calibration data applicable to the first single-axis accelerometer;
  a second single-axis accelerometer external to the node, wherein information about the second single-axis accelerometer resides in the single TEDS memory component that is internal to the node, such information including identifying data and second calibration data applicable to the second single-axis accelerometer; and
  a third single-axis accelerometer external to the node, wherein information about the third single-axis accelerometer resides in the single TEDS memory component that is internal to the node, such information including identifying data and third calibration data applicable to the third single-axis accelerometer transducer,
  wherein the node and the second and third accelerometer are adapted for coupling to a processor to communicate acceleration data from the first, second, and third single-axis accelerometers and to communicate the first, second, and third calibration data to the processor to calculate calibrated acceleration data; and
  wherein the first, second, and third single-axis accelerometers are of the same type, and the single TEDS memory component is configured with a memory map containing (1) identifying data common to all of the first, second, and third single-axis accelerometers and (2) the first, second, and third calibration data unique to the first, second, and third single-axis accelerometers, respectively.

* * * * *